Oct. 22, 1968 G. SIEBERS 3,407,012

ADJUSTABLE, HYDROSTATIC PLAIN BEARING

Filed Dec. 19, 1966 3 Sheets-Sheet 1

Inventor
Gunter Siebers
By
Wenderoth, Lind & Ponack
Attorneys

Oct. 22, 1968     G. SIEBERS     3,407,012
ADJUSTABLE, HYDROSTATIC PLAIN BEARING
Filed Dec. 19, 1966     3 Sheets-Sheet 2

Inventor
Gunter Siebers
By
Wenderoth, Lind & Ponack
Attorneys

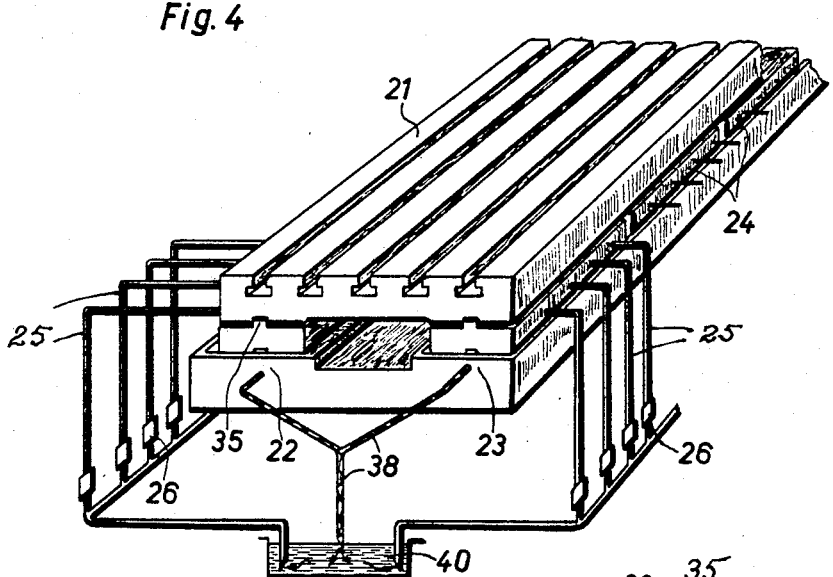
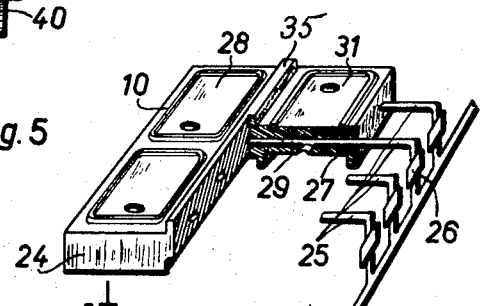
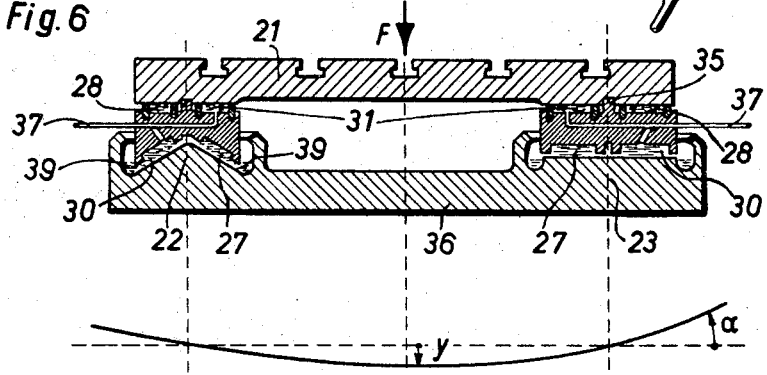

United States Patent Office 3,407,012
Patented Oct. 22, 1968

3,407,012
ADJUSTABLE, HYDROSTATIC PLAIN BEARING
Gunter Siebers, Nurnberg, Germany, assignor to Oerlikon-Buhrle Holding Ltd., Zurich, Switzerland
Filed Dec. 19, 1966, Ser. No. 603,003
Claims priority, application Switzerland, Dec. 23, 1965, 17,743/65
12 Claims. (Cl. 308—122)

ABSTRACT OF THE DISCLOSURE

The bearing is provided with a yielding inflexibility so that the displacement of the bearing under a particular bearing load is determined by such inflexibility. The friction forces upon adjustment of the bearing are maintained as small as possible upon a tilting of the shaft or the like supported by such bearing. If the frictional force is large and the displacement is small, the frictional forces involved in going over from holding friction to sliding friction cause a rearward movement of the part to be adjusted so that the adjustment of this part relative to the inclined or tilted position is inaccurate.

---

The invention concerns an adjustable hydrostatic bearing especially a bearing for the main spindle of a work machine and for maintaining the straightness of a work machine table.

An object of the invention is an improvement of the adjustability of such a bearing.

A further object of the invention is to hold the play in such an adjustable hydrostatic bearing as small as possible in order not to detract from the exactness of the work accomplished.

A still further object of the invention is the provision of a hydrostatic bearing having a yielding inflexibility. The "inflexibility" is similar to that of a stiff spring. The magnitude of the bearing displacement under a particular bearing load is determined by this "inflexibility."

A further object is to hold as small as possible the friction forces which may be encountered upon adjustment of the hydrostatic bearing, for example by a tilting of the supported shaft. If, on the one hand, the frictional force is large and, on the other hand, the displacement is small, the frictional forces involved in going over from holding friction to sliding friction cause a rearward movement of the part to be adjusted, whereby the adjustment of this part relative to the inclined or tilted position is inaccurate.

A further object is to provide an adjustable, hydrostatic plain bearing, for example for the main spindles of a machine tool, or for the straight guide of a table of a machine tool, having a bearing bush mounted in a housing and, having two rows of pressure-fluid cushions disposed between the bearing bush and the housing in the direction of sliding.

In order to render possible adjustment of the bearing in the event of tilting thereof caused by the loading of the shaft, so-called self-aligning bearings are known. Such bearings comprise a spherical bearing bush which is mounted for swivelling in a housing. In order that the bearing bush may be able to adapt itself to the inclination of the shaft, the frictional forces which occur between this spherical bearing bush and the housing have to be overcome. These frictional forces are great with heavily loaded bearings and, in addition, the adjustment distances are short and cause jerky sliding, as a result of which the adjustment of the bearing bush with respect to the tilting takes place inaccurately. In order to overcome these disadvantages it has already been proposed that pressure-fluid cushions should be mounted between the spherical bearing bush and the housing, appropriate recesses for the pressure-fluid cushions being provided at the spherical surface of the bearing bush.

In such self-aligning bearings, therefore, a continuous bearing clearance is present on the one hand between the bearing bush and shaft and on the other hand between the bearing bush and housing.

These two continuous bearing clearances have a disadvantageous effect on the working accuracy which can be achieved by machine tools equipped with such bearings because two continuous bearing clearances detract from the stability of the bearing. The stability of a bearing is a similar concept to the rate of a spring; it is understood to mean the magnitude of the bearing displacement with a specific loading of the bearing. It is an object of the invention to overcome these disadvantages and to provide a hydrostatic plain bearing which adapts itself satisfactorily to tilting of the shaft and renders great working accuracy possible, for example, in a machine tool.

An object of the invention is to provide a hydrostatic plain bearing wherein two rows of pressure-fluid cushions are provided between the bearing bush and the member to be mounted in the bearings, and each pressure-fluid cushion in the first of the two rows of pressure-fluid cushions provided between the bearing bush and the member to be mounted in the bearings is connected to the pressure-fluid cushion, which is adjacent transversely to the direction of sliding, in the second of the rows of pressure-fluid cushions provided between the bearing bush and housing, the resilient bearing bush being rigidly held at one of the two parts constituted by the housing and the member to be mounted in the bearings.

In a plain bearing wherein a sleeve-shaped bearing bush is provided for the mounting of a shaft, the bush may comprise an annular rib in the middle of the outside and the bearing bush may be divided, by means of axially directed slits, into a plurality of resiliently yielding segments, and each of these segments may comprise at least one pressure-fluid cushion. Recesses, which may be provided with seals at their circumference, may be provided on the bearing bush for the pressure-fluid cushions. In a plain bearing serving as a straight guide, bearing bushes, which may be anchored resiliently to the machine table by means of longitudinal ribs, may be provided between the housing and the member to be mounted in bearings, and a row of pressure-fluid cushions may be provided at each side of the longitudinal rib. The seals may consist of elastic material. One source of pressure fluid may be provided for each two pressure-fluid cushions connected to one another.

With the above and other objects in view which will become apparent from the detailed description below, some embodiments of the bearing are shown in the drawings in which:

FIGURE 4 is a partial perspective illustration of the bearing arrangement for the table of the machine tool;

FIGURE 5 is a perspective illustration of part of the bearing bushes shown in FIGURE 4;

FIGURE 6 is a cross-section through the bearing arrangement for the table of the machine tool, illustrated in FIGURE 4.

Figure 1:
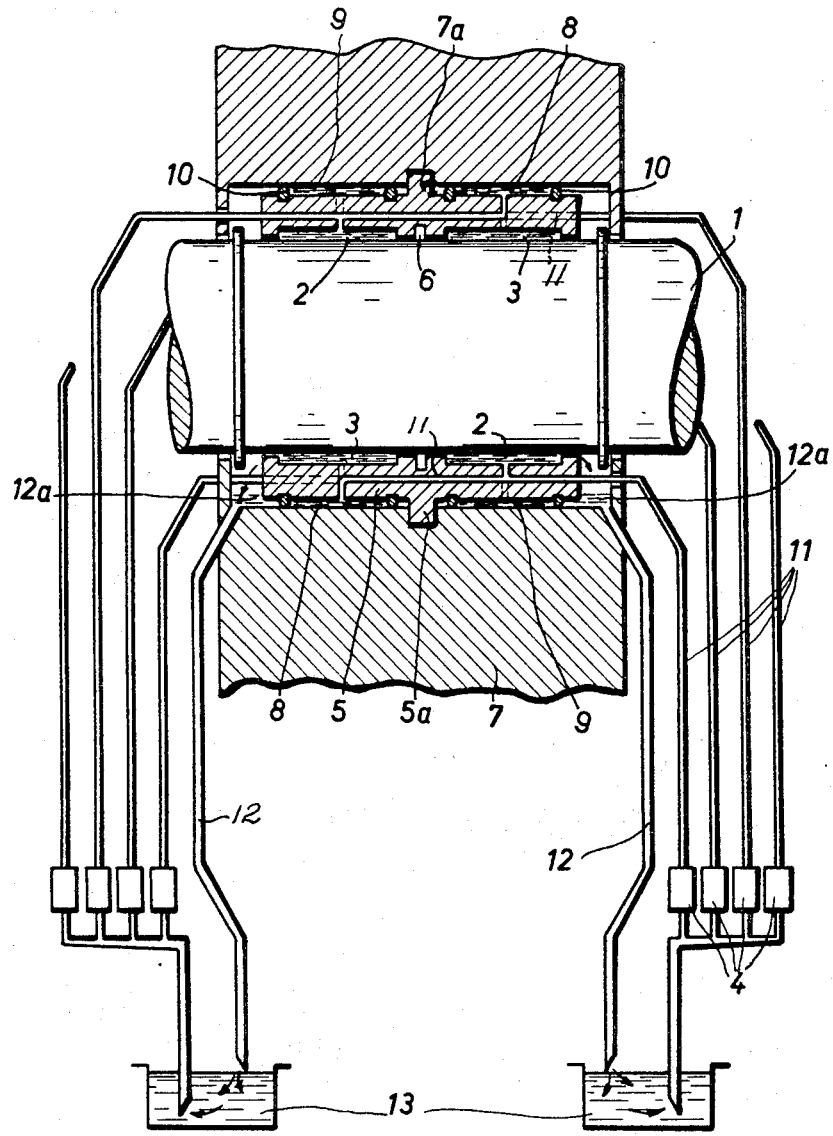
FIGURE 1 shows a longitudinal section through a hydrostatic bearing with the lines for the pressure fluid.
Figure 2:
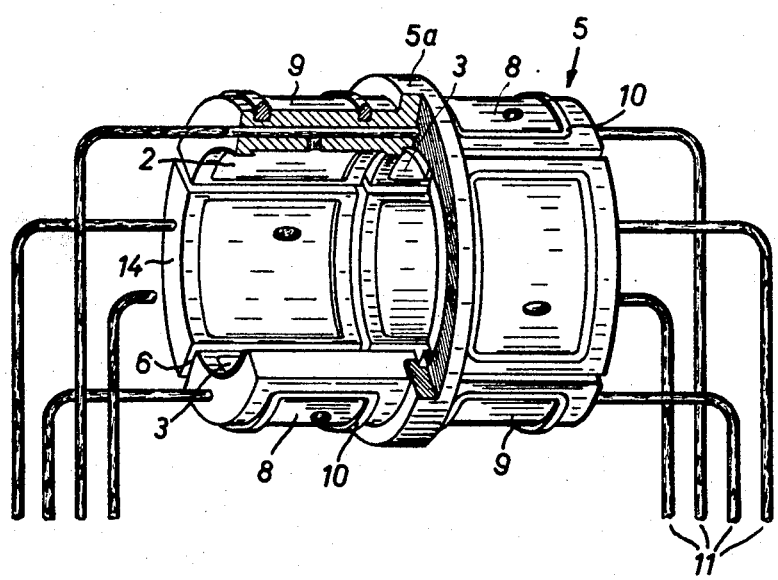
FIGURE 2 is a perspective illustration of the bearing bush illustrated in FIGURE 1, partially in section.

According to FIGURES 1 and 2, a sleeve-shaped bearing bush 5 is rigidly mounted in a housing 7 of a hydrostatic bearing. This bearing bush 5 has, in the middle at the outside, an annular rib 5a which is anchored in a corresponding groove 7a in the housing 7. The bearing bush 5 also has on the outside, one row each of rectangular recesses 8 and 9 at both sides of the rib 5a. These rectangular recesses 8 and 9 are provided, at their edge, with seals 10 which seal off the recesses 8 and 9 all the way round in the bearing bush 5 inserted in the housing 7. Two rows of recesses 2 and 3 are likewise provided at the inside of the bearing bush 5 which serves to receive a shaft 1. These four rows of recesses at the inside and outside of the bearing bush 5 are all disposed in the circumferential direction of the shaft 1 (see FIGURE 2).

As can be seen from FIGURE 1, each recess 2 in the first of the two rows present at the inside of the bearing bush 5 is in communication, through a pipeline 11, with a recess 8 in the second of the two rows present at the outside of the bearing bush 5. And conversely, each recess 3 in the second of the two rows present at the inside of the bearing bush 5 is in communication, through a pipeline 11, with a recess 9 in the first of the two rows present at the outside of the bearing bush 5. Furthermore, each recess 2 and 3 at the inside of the bearing bush 5 is in communication with a source 4 of pressure fluid through the pipelines 11. Between the two rows of recesses at the inside of the bearing bush there is provided an annular groove 6 which serves to receive the pressure fluid emerging from the recesses. Furthermore, in the housing 7, at both sides of the bearing bush 5, there are annular cavities 12a, to which are connected discharge pipes 12 which lead into a reservoir 13.

As can be seen from FIGURE 2, slits 6, which extend as far as the annular rib 5a, are provided between the individual recesses 2, 3 and 8, 9 on the bearing bush 5. Through these slits 6, the bearing bush 5 is divided into individual segments 14 which are resiliently flexible.

Figure 3:
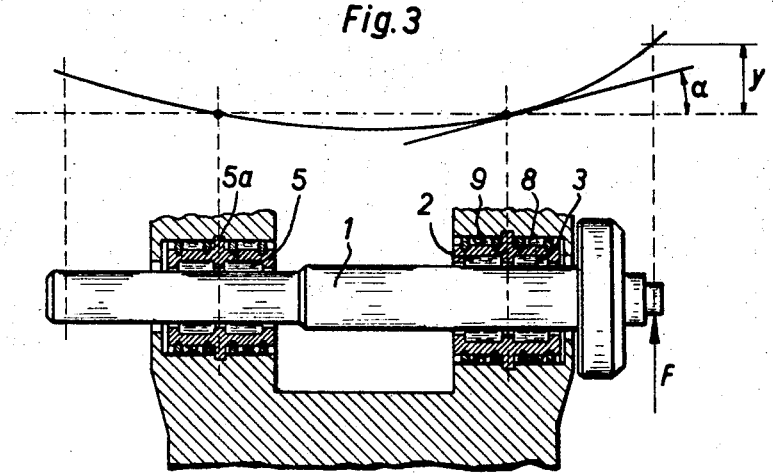
FIGURE 3 is a longitudinal section with parts in elevation through a spindle bearing arrangement on a machine tool.

According to FIGURE 3, two of the bearings described are necessary for example for the mounting of a main spindle of a machine tool. If a force F acts on this main spindle 1 in the direction indicated by the arrow, then the spindle 1 bends as indicated diagrammatically in the upper part of FIGURE 3. On bending by the amount y, the spindle 1 tilts by the angle α in the plain bearing. The mode of operation of the bearing described is then as follows.

Pressure-fluid cushions, which, for the sake of simplicity, are designated by the same reference numerals as the recesses in the drawings, are formed in the recesses 2, 3 and 8, 9 through the source 4 of pressure fluid. The shaft 1 is held in suspension by means of these pressure-fluid cushions in such a manner that it does not touch the bearing bush at any point. Since the recesses at the inside of the bearing bush are in communication with the recesses at the outside of the bearing bush 5 in the manner described, pressure-fluid cushions also form in the recesses at the outside of the bearing bush.

On tilting of the shaft 1, a pressure difference develops between the pressure-fluid cushions in the one row and the pressure-fluid cushions in the other row at the inside of the bearing bush 5. This pressure difference is transmitted, because of the communicating lines 11, to the two rows of pressure-fluid cushions at the outside of the bearing bush. This pressure difference is also caused inter-alia, by the fact that the gap at the edge of the recess between the bearing bush and shaft is reduced at one side of the bearing bush through the tilting of the shaft while it is increased at the other side. The pressure difference described at the inside and outside of the bearing bush cause an elastic deformation of the bearing bush corresponding to the tilting of the shaft, particularly since they mutually reinforce one another, so that edge contact between shaft and bearing bush is avoided even with an inclined shaft.

According to FIGURES 4, 5 and 6 two bearing bushes 24 are secured to the table 21 of a machine tool. Each of these bearing bushes, which is straight in the direction of sliding, has, at its upper side, a rib 35 which is disposed in the direction of sliding of the table and whereby the bearing bush is rigidly anchored in a groove in the table of the machine tool. The bearing bush 24 further has, at its upper side, one row each of rectangular recesses 28 and 31 at both sides of said longitudinal rib 35. These rectangular recesses 28 and 31 are provided, at their edge, with seals which seal off the recesses 28 and 31 in the bearing bush secured to the table 21 of the machine tool, all the way round. Recesses 27 and 30 are likewise provided at the lower side of the two flat bearing bushes 24, each of which is guided in a slideway 22 or 23 respectively in a machine housing 36. These four rows of recesses at the lower and upper side of the flat bearing bush 24 all extend in the direction of movement of the table 21 of the machine tool.

As can be seen from FIGURE 6, each recess 30 in the first of the two rows present at the underside of the flat bearing bush 24 is in communication, through a pipeline 37, with a recess 31 in the second of the two rows present at the upper side of the flat bearing bush. And conversely, each recess 27 in the second of the two rows present at the underside of the bearing bush 24 is in communication, through a pipeline 37, with a recess 28 in the first of the two rows present at the upper side of the bearing bush 24. Furthermore, each of the recesses 27 and 30 at the underside of the bearing bush 24 is in communication with a source 26 of the pressure fluid through the pipelines 25.

As in the first example described, grooves and cavities 39, to which are connected discharge pipes 38 which lead into a reservoir 40, are provided between the rows of recesses and at both sides of the bearing bush. These grooves and cavities 39 serve to receive the pressure fluid emerging from the recesses. Means known per se are provided which prevent the table 21 of the machine tool from being able to lift from the machine housing 36.

According to FIGURE 6, the table of the machine tool is mounted for displacement on the housing 36 of the machine by means of two hydrostatic bearings. If a force F acts on this table 21 of the machine tool in the direction indicated by the arrow, the table 21 bends as indicated diagrammatically in the lower part of FIGURE 6. On bending of the table by the amount y, the table is inclined by the angle α in the region of the bearing. The mode of operation of the bearing described is then as follows.

Pressure-fluid cushions, which are designated by the some reference numerals as the recesses in the drawing for the sake of simplicity, are formed in the recesses 27, 30 and 28, 31 respectively by the sources 26 of pressure fluid. By means of these pressure-fluid cushions, the table 21 of the machine tool is held in suspension in such a manner that the bearing bushes 24 do not touch the slideways 22 or 23 respectively of the housing at any point. Since the recesses 27, 30 at the underside of the bearing bush 24 are in communication, in the manner described, with the recesses 28, 31 at the upper side of the bearing bush 24, pressure-fluid cushions also form in the recesses 28, 31 at the upper side of the bearing bush 24.

On bending of the table, a pressure difference develops between the pressure-fluid cushions 27 in the one row and the pressure-fluid cushions 30 in the other row at the lower side of the bearing bush 24. Because of the communicating pipelines 37, this pressure difference is transmitted to the two rows of pressure-fluid cushions 28, 31 at the upper side of the bearing bush 24. This pressure difference is also caused inter alia, as a result of the fact that the gap at the edge of the recess between bearing bush and housing is reduced at one side of the bearing bush as a result of the bending of the table while it is increased at the other side. The pressure differences described cause an elastic deformation of the bearing bush corresponding to the deflection of the table, particularly since they reinforce one another mutually, so that edge contact between the bearing bush and housing slideway is avoided on bending of the table. The bearing bush is substantially resilient in construction in the region of its rib 35. The seals 10 preferably consist of elastic material.

I claim:

1. An adjustable hydrostatic plain bearing for machine tools and the like comprising a housing, a bearing bush mounted in said housing having a first two rows of pressure-fluid cushions disposed in the direction of sliding between said bearing bush and housing, wherein in addition to said pressure-fluid cushions, a second two rows of pressure-fluid cushions between said bearing bush and a member to be mounted in the bearing, each pressure-fluid cushion in the first of said two rows of pressure fluid cushions disposed between the bearing bush and the member to be mounted in bearings being in communication with the pressure-fluid cushion, adjacent transversely to the direction of sliding, in said second row of pressure-fluid cushions disposed between the bearing bush and the housing, and said bearing bush being resilient and rigidly held at one of the two parts constituted by said housing and the member to be mounted in the bearing.

2. A plain bearing as claimed in claim 1, wherein a sleeve-shaped bearing bush is provided for the mounting of a shaft, said bearing bush comprising an annular rib in the middle of the outside and being divided by axially directed slits into a plurality of resiliently yielding segments, each of said segments comprising at least one pressure-fluid cushion at the inside and outside of the bearing bush.

3. A plain bearing as claimed in claim 1, wherein said bearing bush is anchored, by means of a longitudinal rib to the member to be mounted in the bearings, a row of pressure-fluid cushions being provided at each side of said longitudinal rib.

4. A plain bearing as claimed in claim 3, wherein recesses provided with seals at their periphery, are provided for the pressure-fluid cushions at the bearing bushes.

5. A plain bearing as claimed in claim 4, wherein said seals consist of rubbery elastic material.

6. A plain bearing as claimed in claim 1, wherein a force of pressure fluid is provided for each two pressure-fluid cushions which are connected to one another.

7. An adjustable hydrostatic bearing assembly comprising a housing, a body associated with said housing, means for rigidly securing a bearing on one of said parts, said bearing being resilient within said housing, a first double row of pressure fluid cushions arranged in said bearing in the direction of slip of said body, a second double row of pressure fluid cushions also arranged in said bearing in the direction of slip of said body, said first double row consisting of pressure fluid cushions adjacent the pressure fluid cushions of said second double row between said bearing and housing, and said second double row consisting of pressure fluid cushions adjacent the pressure fluid cushions of said first double row between said bearing and body and fluid connections between a pressure fluid cushion of said first double row located between said bearing and body with an adjacent pressure fluid cushion of said second double row located between said bearing and said housing.

8. Adjustable hydrostatic bearing assembly according to claim 7 wherein said bearing is sleeve-shaped and said body is a shaft, said bearing having an annular rib in the center of the exterior thereof and axially extending slots forming a plurality of elastically resilient segments with each of said segments having at least one of said pressure fluid cushions at the interior and exterior of said bearing.

9. Adjustable hydrostatic bearing assembly as set forth in claim 7 wherein said means for securing said bearing comprises a rib on said bearing extending in the direction of slip to couple said bearing rigidly to said body.

10. Adjustable hydrostatic bearing assembly according to claim 7 wherein said bearing has recesses for said pressure fluid cushions and packings enclose said recesses.

11. Adjustable hydrostatic bearing assembly according to claim 10 wherein said packings are elastic rubber material.

12. Adjustable hydrostatic bearing assembly as claimed in claim 7 wherein a source of pressure fluid is provided for two pressure fluid cushions fluid connected to one another.

References Cited

UNITED STATES PATENTS 3,338,643  8/1967  Wilcock _____ 308—122

MARTIN P. SCHWADRON, *Primary Examiner.*

FRANK SUSKO, *Assistant Examiner.*